(12) United States Patent
Akella et al.

(10) Patent No.: US 12,522,207 B1
(45) Date of Patent: Jan. 13, 2026

(54) DETERMINING ADVERSARIAL COST BASED ON GENERATED DEVIATIONS

(71) Applicant: Zoox, Inc., Foster City, CA (US)

(72) Inventors: Abishek Krishna Akella, Pleasanton, CA (US); Timothy Caldwell, Boulder, CO (US); Clark Michael Davenport, San Bruno, CA (US); Marin Kobilarov, Baltimore, MD (US); Joseph Lorenzetti, Foster City, CA (US); Anjali Lakshmi Pemmaraju, San Francisco, CA (US); Shahriar Sefati, San Francisco, CA (US); Seyed Mahdi Shamsi, Daly City, CA (US); Jacob Patrick Thalman, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 112 days.

(21) Appl. No.: 18/679,987

(22) Filed: May 31, 2024

(51) Int. Cl.
 *B60W 30/09* (2012.01)
 *B60W 30/095* (2012.01)
 *B60W 60/00* (2020.01)

(52) U.S. Cl.
 CPC ........ *B60W 30/09* (2013.01); *B60W 30/0956* (2013.01); *B60W 60/0015* (2020.02); *B60W 60/0027* (2020.02)

(58) Field of Classification Search
 None
 See application file for complete search history.

(56) References Cited

U.S. PATENT DOCUMENTS

| | | | |
|---|---|---|---|
| 10,649,459 B2 | 5/2020 | Wang et al. | |
| 10,921,811 B2 | 2/2021 | Levinson et al. | |
| 10,955,851 B2 | 3/2021 | Ghafarianzadeh et al. | |
| 11,055,624 B1* | 7/2021 | Sapp | G06N 7/01 |
| 11,807,233 B1* | 11/2023 | Clawson | B60W 30/09 |
| 11,875,678 B2 | 1/2024 | Huang et al. | |
| 2018/0208192 A1* | 7/2018 | Olsson | B60T 8/17558 |
| 2018/0284785 A1* | 10/2018 | Berntorp | G06N 3/08 |
| 2021/0370972 A1* | 12/2021 | Bagschik | G06N 20/20 |
| 2022/0105959 A1* | 4/2022 | Hartnett | B60W 50/0097 |

(Continued)

OTHER PUBLICATIONS

U.S. Appl. No. 18/540,642, filed Dec. 14, 2023, Kulgod, et al., "Machine-Learned Cost Estimation in Tree Search Trajectory Generation for Vehicle Control", 88 pages.

*Primary Examiner* — Ryan Rink
(74) *Attorney, Agent, or Firm* — Lee & Hayes, P.C.

(57) ABSTRACT

Techniques for determining adversarial cost(s) representing an object in an environment are described herein. For example, a vehicle may generate candidate action(s) (or trajectories) and input such candidate actions into a tree structure. The vehicle can determine a control trajectory for the vehicle to follow based a determining which of the candidate actions to follow at each layer in the tree structure. The vehicle can determine which candidate action to follow based on determining adversarial cost(s). To generate the adversarial cost(s), the vehicle can detect an object and determine associated object trajectories. Based on a likelihood that the object will deviate from a predicted object trajectory, the vehicle can determine one or more sub-factors that may be combined to generate the adversarial cost(s). The vehicle can be controlled based on the adversarial cost(s).

20 Claims, 6 Drawing Sheets

(56) References Cited

U.S. PATENT DOCUMENTS

| | | | |
|---|---|---|---|
| 2022/0135029 A1* | 5/2022 | Poubel Orenstein | ........................ B60W 30/0953 701/301 |
| 2022/0176995 A1* | 6/2022 | Subramanian | ........ B60W 30/08 |
| 2022/0185267 A1* | 6/2022 | Beller | ................ B60W 30/0956 |
| 2023/0041975 A1* | 2/2023 | Caldwell | ........... B60W 60/0027 |
| 2024/0085922 A1* | 3/2024 | Shalev-Shwartz | ........................... G01C 21/3415 |
| 2024/0092398 A1 | 3/2024 | Caldwell et al. | |
| 2024/0383501 A1* | 11/2024 | Khamis | ............. B60W 60/0053 |
| 2025/0115279 A1* | 4/2025 | Stein | ................. B60W 60/0015 |

\* cited by examiner

DETERMINING ADVERSARIAL COST BASED ON GENERATED DEVIATIONS

BACKGROUND

Vehicles, such as autonomous vehicles, may navigate along designated routes. In some examples, autonomous vehicles may encounter various types of static and/or dynamic objects within an environment. In some circumstances, the autonomous vehicle may use sensors to detect and/or classify these objects. Upon detecting such objects, the autonomous vehicle may predict object trajectories and evaluate these predicted trajectories to determine future actions for the vehicle. However, in certain circumstances, techniques for determining future actions based on predicted trajectories can be inefficient and/or lead to inaccurate and/or misleading information which may impact the safe operation of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
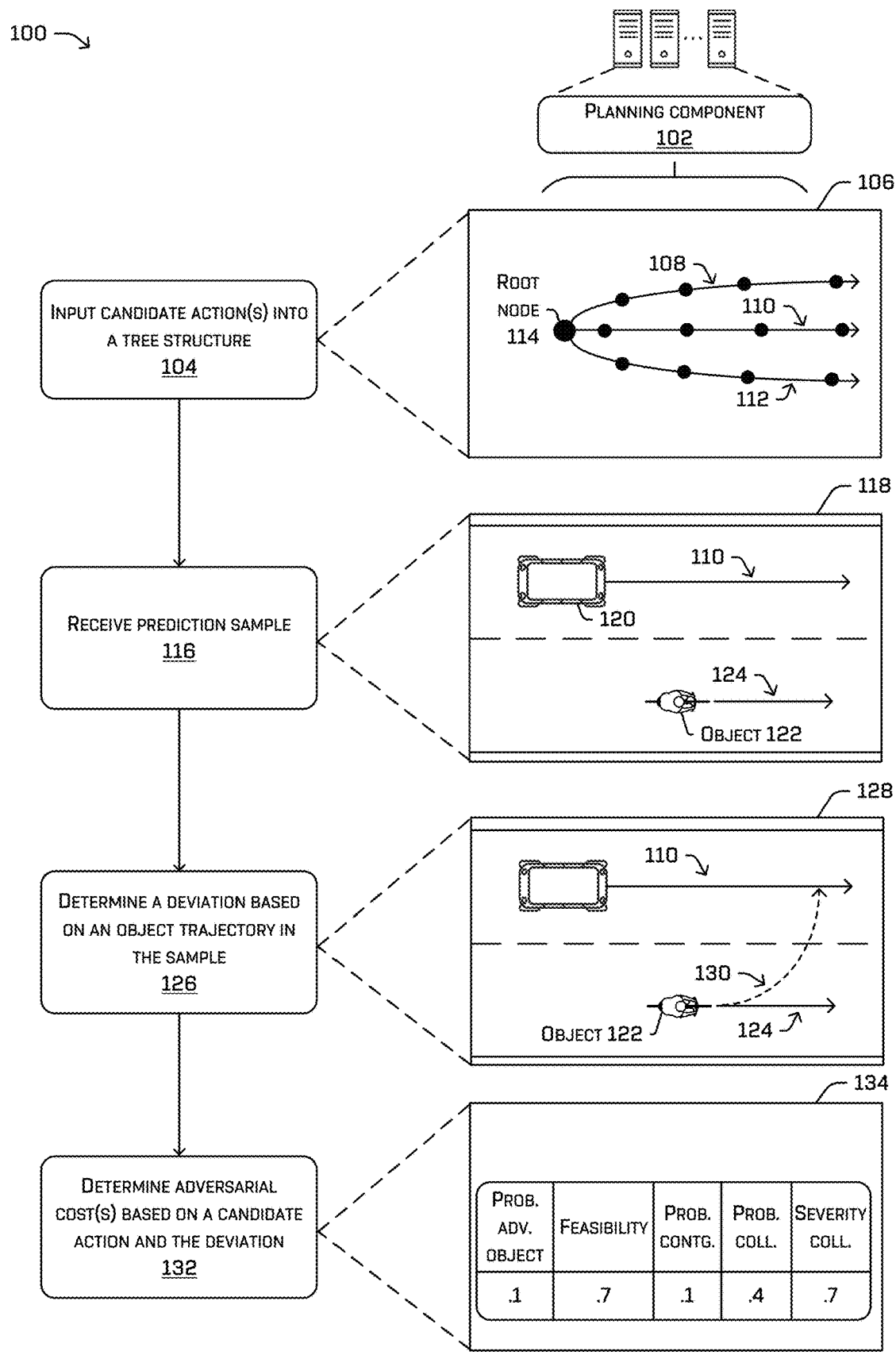
FIG. 1 is a pictorial flow diagram illustrating an example technique determining adversarial cost(s) based on trajectory deviations, in accordance with one or more examples of the disclosure.

Techniques for determining adversarial cost(s) for determination of a trajectory for a vehicle to execute are described herein (e.g., costs associated with an object in the environment proximate the vehicle if the object were to take an action to interfere with travel of the vehicle). In some examples, a vehicle (such as an autonomous vehicle) may generate one or more candidate actions (or trajectories) and input such candidate actions into a tree structure. The vehicle can determine a control trajectory for the vehicle to follow based a determining which of the candidate actions to follow at each layer in the tree structure. The vehicle can determine which candidate action to follow based on determining one or more costs, such as costs related to safety, policy compliance, comfort of passengers, etc., as well as adversarial cost(s). To generate the adversarial cost(s), the vehicle can receive object data that includes a detected object and/or associated predicted object trajectories. In such cases, the vehicle can generate lateral and/or longitudinal deviating trajectories based on the predicted object trajectories (e.g., the deviating trajectory being different than the object trajectory). Based on generating the deviating object trajectory, the vehicle can determine one or more sub-factors (e.g., probability that the object is an adversarial object, a feasibility of the object following the deviating trajectory, a probability that the vehicle can avoid a collision, a probability of a collision, a severity of the collision, etc.) that may be combined to generate the adversarial cost(s). In some examples, the adversarial cost(s) may be used in the tree structure to evaluate the candidate actions and as such, the vehicle can be controlled based on the adversarial cost(s). As described in more detail below, the techniques described herein may improve vehicle safety and/or driving efficiency by ensuring that a broader range of object actions are considered by the vehicle, thereby allowing the vehicle to generate more efficient and accurate control trajectories.

When determining vehicle actions based on predicted object behaviors, it may be beneficial to evaluate many candidate object maneuvers. For example, a planning component of a vehicle system may use a tree search to determine a control trajectory to follow throughout the environment. When determining the control trajectory, the planning component may receive predictions from a prediction component. The predictions may be representative of the most likely evolution of the environment within a period of time and may include sample scenarios (e.g., a subset of objects with the object's associated predicted trajectory). In such instances, the planning component may use the predictions to evaluate and/or determine cost(s) between a variety of different candidate actions (or candidate trajectories). However, in some circumstances, the predictions may be an incomplete representation of the potential driving scenarios that could take place proximate the vehicle. That is, the prediction component may send three (or four, five, etc.) different samples to the planning component; however, in reality, there are endless possible permutations describing what could take place in the environment. As such, the planning component may be limited in that it may be unable to evaluate the candidate actions using all potential possibilities of how the environment can progress. Accordingly, the techniques and systems described herein may allow the vehicle to determine a trajectory based on consideration of other object behaviors.

To address these and other technical problems and inefficiencies, the systems and/or techniques described herein include a planning component (which also may be referred to as a "planning system" or "planner component") configured to generate lateral and/or longitudinal adversarial cost(s) based on generating laterally and/or longitudinally deviating trajectories. Technical solutions discussed herein solve one or more technical problems associated with conventional techniques resulting in an incomplete and/or inaccurate evaluation of the potential object movements proximate the vehicle.

In some examples, the planning component may generate one or more candidate actions. A candidate action may be a trajectory that includes a spatial representation of future movements of the vehicle in addition to one or more vehicle controls (e.g., velocity, acceleration, yaw, steering angle, etc.). That is, the candidate actions may include instructions that instruct the vehicle as to how to navigate a portion of the environment. The candidate actions can include instructions that cause the vehicle to perform a combination of various types of actions, such as remain in the same lane, lane change left, lane change right, pass an object proximate the vehicle, modify vehicle kinematics (e.g., velocity, acceleration, etc.), and/or any other type of action. In some examples, a candidate action may include multiple predicted states that can represent the state information of the vehicle at a specific location along the candidate action. State information may include location data, pose data (e.g., lateral offset data, longitudinal offset data, heading offset data), velocity data, acceleration data, and/or other types of data. Examples of various techniques for generating planner actions (or trajectories) for autonomous vehicles can be found, for example, in U.S. Pat. No. 10,921,811, filed on Jan. 22, 2018, issued on Feb. 16, 2021, and titled, "Adaptive Autonomous Vehicle Planner Logic," in U.S. patent application Ser. No. 18/540,642, filed Dec. 14, 2023, and titled "Machine-Learned Cost Estimation in Tree Search Trajectory Generation for Vehicle Control," in U.S. Pat. No. 11,875,678, filed on Jan. 21, 2021 and issued on Jan. 16, 2024, and titled "Unstructured Vehicle Path Planner," and in U.S. Pat. No. 10,955,851, filed on Feb. 14, 2018, issued on Mar. 23, 2021, and titled, "Detecting Blocking Objects," each of which is incorporated by reference herein in its entirety and for all purposes.

In some examples, the planning component may generate a control trajectory which may be a combination of the one or more candidate actions. That is, to determine which of the one or more candidate actions to follow, the planning component may use a tree structure. Accordingly, the planning component may generate a tree structure that includes some or all of the candidate actions. A tree structure may include one or more nodes representing vehicle states at different action layers of the tree structure. Further, each vehicle state may include multiple candidate actions which the vehicle may follow. As described in more detail below, the planning component may use the tree structure to determine or otherwise select one or more of the candidate actions to follow from a node in the tree structure to a different node at the next layer of the tree structure. The planning component may determine which candidate actions to follow between layers of nodes based on one or more costs. Example techniques for generating a tree structure and determining a control trajectory based on the tree structure can be found, for example, in U.S. application Ser. No. 17/900,658, filed Aug. 21, 2022, and titled "Trajectory Prediction Based on a Decision Tree," the contents of which is herein incorporated by reference in its entirety and for all purposes.

In some examples, the planning component can determine a control trajectory based on the tree structure. The planning component can evaluate some or all candidate actions when determining a control trajectory. A solution to the tree may result in a series of nodes of the one or more candidate actions which, when traversed (e.g., moving along and between differing trajectories and/or action layers of the tree structure), results in a control trajectory (e.g., output trajectory) having a lowest determined overall cost. An overall cost for the control trajectory may represent and/or be indicative of the combination of one or more sub-costs. A cost value can indicate the safety, progress, comfort, risk, convenience, and/or efficiency of a candidate trajectory. For instance, a high cost value may indicate heightened degree of risk, danger, inconvenience, discomfort, and/or inefficiency of the trajectory. In contrast, a low cost value may indicate a lower degree of risk, danger, inconvenience, and/or inefficiency of the trajectory. In some examples, sub-costs may include comfort related costs (e.g., acceleration cost, jerk cost, steering cost, path reference cost, etc.), legality related costs, policy related costs, safety related costs (e.g., lane changing costs), progress costs, debris cost, a lane blocking cost, a lane ending cost, an exit cost, an approach cost, a space cost, a payment cost, a yaw cost, adversarial cost(s), lane targeting cost (e.g., cost associated with the vehicle being located in a desired lane), cyclist related cost(s), and/or any other type of cost.

As noted above, one of the sub-costs may be adversarial cost(s). That is, the planning component may generate one or more adversarial cost(s) to be included in the overall cost. The adversarial cost(s) may be designed to measure the potential adversarial actions that an object may take that may deviate from the predicted object trajectories. In some cases, the planning component may determine different types and/or components of adversarial costs. For example, adversarial costs may include a lateral adversarial cost which may be a cost that measures the cost of a laterally deviating trajectory (e.g., relative to the object trajectory) and a longitudinal adversarial cost which may be a cost that measures the cost of a longitudinally deviating trajectory (e.g., relative to the object trajectory). In some examples, the lateral adversarial cost may be a different cost term (or value) than the longitudinal adversarial cost. However, in other examples, the planning component may generate a single adversarial cost by combining the lateral and longitudinal adversarial costs.

When determining the lateral and/or longitudinal adversarial costs, the planning component may receive prediction samples from a prediction component of the vehicle. A sample may be a candidate scenario in which some or all objects in the sample have a single candidate trajectory. In some examples, the prediction component may predict object trajectories and generate samples based on such predicted trajectories. That is, the prediction component may generate different samples (e.g., candidate scenarios) and determine which samples are the most likely to occur. For example, the prediction component may evaluate such samples and send the n-highest ranked (where a high rank is indicative of a high likelihood of occurring) samples to the planning component. As described below, the planning component may use the samples when determining the lateral and/or longitudinal adversarial cost(s).

When determining the lateral adversarial cost, the planning component may generate lateral deviations (or modified object trajectories) extending from an object trajectory in the sample received from the prediction component. A lateral deviation or deviating trajectory may be an explicit or implicit trajectory or path with a constant curvature that extends from a location (or position) along the object trajectory to a state of the vehicle associated with a portion of a candidate action. An explicit (deviated) trajectory may be generated and tested individually, while an implicit (deviated) trajectory can be defined by identifying a point in the environment to which the object is to navigate and associating a constant curvature trajectory between a point of the object trajectory and the point in the environment, increasing the physical area associated with a location of the vehicle by taking trajectory, whereby increasing the potential areas covers the potential deviations, etc. The planning component may generate (or determine) implicit deviations that would be adversarial if the object deviates from the object trajectory in the sample. That is, the planning component may limit the directions in which the deviations are generated to the direction of the candidate action and/or based on various kino-dynamic constraints.

In some examples, the planning component may generate one or more lateral deviations for some or all object trajectories in a sample. That is, the planning component may identify an object trajectory in the sample. The planning component may generate one or more lateral deviations extending from a location along the object trajectory to a state of the candidate action that is being evaluated. When generating the deviation, the planning component may generate the deviation from a prior state (e.g., state with a timestamp that is before the timestamp of the state of candidate action being evaluated) of the object trajectory. That is, as described above, when evaluating candidate actions in a tree structure, the planning component may evaluate nodes at different action layers or timesteps. For example, a root node may correspond to a current time and at the current location of the vehicle. In this case, when determining the lateral deviation, the planning component may generate a lateral deviation extending from the current location (or state) of the object to the current position of the vehicle. However, when evaluating a different node at a different action layer of the tree structure, for example the node at three seconds into the future, the planning component can generate a lateral deviation extending from a state of the object trajectory at the current time to the node of the candidate action at three seconds, a lateral deviation extending from a state of the object trajectory at one second in the future to the node of the candidate action at three seconds, etc. In some examples, the planning component may generate one or more deviations from different locations (or states) along the object trajectory that extend to a node being currently evaluated in the tree search.

Based on generating the lateral deviation(s), the planning component may determine a lateral adversarial cost to associated with the candidate action. When determining the lateral adversarial cost, the planning component may make various sub-cost determinations. Those sub-costs may be aggregated (such as by multiplication) to determine an ultimate adversarial cost. As a non-limiting example, such an aggregation may be expressed given the formula:

$$j_A(t_i, t_c) = P(adv) * P(\text{feas}|A) * (1 - P(\check{C}|A, H)) * P(C|x^H(t_c), x^A(t_c)|A)) * S(C|x^H(t_c), x^A(t_c)|A))$$ Equation 1

In this equation, $j_A(t_i, t_c)$ may represent the lateral adversarial cost calculated at time $t_c$ (e.g., current time for the state being evaluated) for the lateral deviation, A, originated at $t_i$ (e.g., a past time (i.e., $t_i < t_c$) form which the laterally deviating trajectory is initiated (or starts)).

Further, in this equation, P(adv) may represent the probability that the object will perform (or follow) the lateral deviation. That is, P(adv) may represent a level of unpredictability of the object. In some examples, the planning component may determine P(adv) based on evaluating previous actions (e.g., erratic behavior, nominal behavior, etc.) of the object, utilizing machine-learned models, etc. For example, the planning component may train one or more machine-learned models to output a likelihood that the object is adversarial to the vehicle based at least part on, for example, multiple previous observations (and/or a lack of observations) of the object over a period of time, or otherwise determined from additional components. Alternatively or additionally, the planning component may identify predictions of the object behavior (e.g., actions, trajectories, etc.) from a previous time (e.g., three seconds in the past, six seconds in the past, etc.) and identify the actual object behavior. In this case, the planning component may compare the predicted behaviors with the actual behaviors to determine a similarity value. The similarity value may be based on lateral and/or longitudinal distances between the object in the predicted and actual behaviors, kinematic differences, state data differences (e.g., velocity differences, pose differences, acceleration differences, steering angle differences, etc.), etc. The higher the similarity value, the planning component may determine that there is a lower likelihood that the object is adversarial. However, the lower the similarity value, the planning component may determine that there is a higher likelihood that the object is adversarial.

Further, in this equation, P(feas|A) may represent the probability that the object can feasibly follow the lateral deviation based on the kinematic (or dynamic) constraints and the required controls of the object. That is, the planning component may determine whether the object can feasibly navigate along the curvature of the lateral deviation, A. When determining the feasibility of the lateral deviation, the planning component may determine the type of object. That is, some or all types of objects may have different kinematic constraints. For example, a pedestrian may have different kinematic constraints than a cyclist or vehicle. As such, the planning component may determine current state data (e.g., current velocity, acceleration, pose, steering angle, etc.) and determine, based on the current state data and the kinematic constraints, if the object is capable of following the lateral deviation. Based on such evaluations, the planning component may determine a feasibility of the lateral deviation.

Further, in this equation, $(1-P(\check{C}|A, H))$ may represent the probability that the vehicle has (or does not have) a contingency option (e.g., $\check{C}$) available based on the lateral deviation, A, and the candidate action, H. That is, $(1-P(\check{C}|A, H))$ represents the probability that the vehicle cannot avoid the interaction (or collision) by slowing down, stopping, accelerating, changing lanes, and/or modifying any other type of kinematic value. In this example, the planning component may determine a distance from the root node to the node being evaluated and determine, based on the distance and the kinematic constraints of the object, whether the vehicle is able to stop prior to the interaction location (e.g., node being evaluated), whether the vehicle is able to accelerate through the interaction location prior to the collision, whether the vehicle is able to change driving lanes to avoid the collision (e.g., are there laterally adjacent driving lanes, are the laterally adjacent driving lanes unoccupied, etc.), etc.

Further, in this equation, $P(C|x^H(t_c), x^A(t_c)|A))$ may represent the probability of a collision (e.g., C) occurring based on the object following the lateral deviation (e.g., A). That is, $P(C|x^H(t_c), x^A(t_c)|A))$ may represent the probability that the vehicle is in collision, C, given $x^H(t_c)$ (e.g., state of the vehicle at time the) and the object state, $x^A$ at time the given the lateral deviation A (e.g., object state at the same timestep as the candidate action state being evaluated). In some examples, the planning component may determine the probability of collision based on identifying a location $x^A(t_c)$ along the lateral deviation that the object will reach based on the kinematic constraints of the object. The planning component may determine the probability based on a distance between the location $x^A(t_c)$ of the object and the location of the state $x^H(t_c)$ of the candidate action being evaluated. That is, the closer (e.g., smaller the distance) the object gets to the location of the state being evaluated, the planning component may determine that there may be a higher likelihood of collision. In contrast, the further away (e.g., higher distance) the object is from the location of the state being evaluated, the planning component may determine that there may be a lower likelihood of collision.

Further, in this equation, $S(C|x^H(t_c), x^A(t_c|A))$ may be a value representing the severity of the potential collision, C, based on the object following the lateral deviation, A. That is, $S(C|x^H(t_c), x^A(t_c|A))$ may represent the severity of a collision, C, between the vehicle state, $x^H(t_c)$ and the object state, $x^A(t_c)$ given the deviation A. The planning component may determine the level of severity based on various factors such as relative velocity between the object and the vehicle (e.g., higher relative velocity may correlate to a more severe collision), relative heading between the object and the vehicle (e.g., higher relative heading angle may correlate to a more severe collision), etc. In such cases, the planning component may evaluate the relative velocity and/or the relative heading angle to determine the severity level of the collision.

In some examples, the planning component may generate the lateral adversarial cost based on the factors discussed in Equation 1. That is, the lateral adversarial cost may be determined based on a combination of the probability that the object may conduct the lateral deviation, the feasibility, the probability of the vehicle having (or not having) a contingency, a probability of a collision, and/or a severity of the collision. In some examples, the planning component may associate the lateral adversarial cost with the candidate action being evaluated in the tree structure.

As described above, the planning component may also determine a longitudinal adversarial cost. The purpose of determining a longitudinal adversarial cost may be because there may be a predicted collision but the timing of that collision may be different based on whether the object accelerates, decelerates, etc. As such, the planning component may consider possible longitudinal deviations to gain a better or more accurate representation of what the object may do in the future.

When determining the longitudinal adversarial cost, the planning component may generate longitudinal deviations (or modified object trajectories) from the object trajectory of the sample received from the prediction component. A longitudinal deviation or longitudinal deviating trajectory may be an explicit or implicit trajectory or path that does not deviate laterally from the object trajectory but deviates longitudinally by modifying the acceleration, velocity, etc. of the object trajectory. Generating implicit longitudinally deviating trajectories may modify the timing of the potential collision from the timing of a potential collision based on the object trajectory. Similar to the lateral deviations, the planning component may generate the longitudinal deviation by modifying the longitudinal kinematics of the vehicle starting at any state (or position) of the object trajectory.

Based on generating the longitudinal deviation(s), the planning component may determine a longitudinal adversarial cost to associate with the candidate action. When determining the longitudinal adversarial cost, the planning component may solve Equation 1 described above. That is, the planning component may determine a probability that the object is adversarial, a feasibility of the longitudinal deviation, and/or a severity of a collision in a similar or identical manner as was described above. However, when determining the probability that the vehicle has (or does not have) a contingency action or the probability of a collision, the planning component may determine one or more capsules (e.g., geometric area representing area that the vehicle or object are predicted to occupy), identify an interaction region (or collision zone) based on the capsules, and/or determine the probabilities based on the interaction region.

For example, the planning component may generate a trajectory extending between two states of the candidate action. That is, the trajectory may be a constant curvature trajectory that spans between two different states of the candidate action. The planning component may generate a first trajectory extending between two states of the candidate action of the vehicle and a second trajectory extending between two states of the longitudinal deviation. For instance, the planning component may identify a state of the candidate action currently being evaluated in the tree structure. Further, the planning component may identify, at the same timestep as the state being evaluated, a state of the object based on the longitudinal deviation. For example, the state being evaluated may be a state five seconds in the future and as such, the planning component may identify the object state that is five seconds in the future. Next, the planning component may identify a previous state of the candidate action and a previous state of the object at the same or different timestep. For instance, the planning component may identify a candidate action state at two seconds into the future which would ultimately be three seconds before the state currently being evaluated (e.g., which is at five seconds in the future). However, this is not intended to be limiting; in other examples, the planning component may select (or identify) any state prior to the evaluation state. There may, however, be benefits to selecting a state that is close to the evaluation state because the uncertainty of the environment may grow the larger the gap between states.

Based on identifying the two candidate action states and the two corresponding longitudinal deviation states, the planning component may generate a candidate trajectory (or path) between such states. That is, the planning component may identify a portion of the candidate trajectory that extends between the candidate action state at three seconds in the future to the candidate action state at five seconds in the future and generate a candidate trajectory that corresponds to the portion. Further, the planning component may identify a portion of the candidate trajectory that extends between the longitudinal deviation state at three seconds in the future to a longitudinal deviation state at five seconds in the future and generate a candidate trajectory that corresponds to the portion. As noted above, the candidate trajectories may be a constant curvature trajectory which may increase computational efficiency and/or increase available bandwidth within the planning system.

In some examples, the planning component may generate two capsules based on the candidate trajectories. A capsule (or geometric area) may be an enclosed region representing the area of the environment that the vehicle and object are predicted to occupy based on following the candidate trajectories. The planning component may generate a capsule for the vehicle candidate trajectory (or a portion thereof) and a separate (and different) capsule for the object candidate trajectory (or a portion thereof). When generating the capsule, the planning component may place a circle representative of the size of the vehicle over the previous state at three seconds into the future. The planning component may then generate the capsule that is the width of the circle diameter and extends along the candidate trajectory (e.g., from three seconds in the future to five seconds in the future). The planning component may perform similar operations to generate the capsule for the object.

Based on generating the capsules, the planning component may identify an interaction region. The interaction region may be a region of the environment that a collision may occur based on the candidate trajectories. Further, the interaction region may be defined by entry and exit points (or locations). The entry point may be the location at which the leading edge, as the circles moves from the first node (e.g., three seconds in the future) to the second node (e.g., five seconds in the future), of the vehicle circle intersects with the leading edge of the object circle. The exit point may be the location at which the trailing edge of the vehicle circle and the object circle stop (e.g., cease, fail to, lack, etc.) intersecting. The region between the entry and exit points may be the interaction region.

Based on identifying the interaction region, the planning component may determine a probability of the vehicle having (or not having) a contingency (e.g., $(1-P(\check{C}|A, H)$ and a probability of collision (e.g., $P(C|x^H(t_c), x^A(t_c|A)))$. When determining such probabilities, the planning component may use similar techniques as described above with respect interaction region. For example, the planning component may determine a distance from the prior state (of the vehicle) to the interaction region and determine, based on the distance, state data (e.g., velocity, acceleration, steering angle, yaw, etc.), whether the vehicle could avoid the interaction region, as described above.

Upon determining the adversarial cost(s) (e.g., lateral and/or longitudinal adversarial costs) and the one or more other sub-costs, the planning component may determine or otherwise combine the sub-costs into a single overall cost. In various examples, differing cost types may be associated with differing weights based on, for example, importance. As a non-limiting examples, a safety cost may be associated with a higher weight than a comfort cost. Further, such costs may be weighted differently, and as such, different costs may affect the overall cost in different proportions. In some examples, the vehicle may determine to follow a control trajectory that has the lowest overall cost compared to the overall costs of other potential traversal paths between the candidate trajectories.

In some examples, the vehicle may follow the control trajectory while operating within the environment. Upon determining the control trajectory from the tree search, the vehicle may follow the control trajectory throughout the environment. As such, the vehicle may be controlled based on the lateral and/or longitudinal adversarial cost(s).

Additionally or alternatively, the planning component may determine lateral and/or longitudinal adversarial cost(s) using one or more alternative metrics or types of interactions. An interaction may be defined as a collision (or probability of a collision as discussed above), a time gap being below a threshold time, a distance between the vehicle and the object at the state being evaluated being below a threshold distance, a distance between the vehicle at the current state and the state being evaluated, etc. For example, the planning component may determine the adversarial cost(s) based on time gap metrics (or values), distances between the vehicle and the object, distances between the vehicle at the current state and the evaluated state, etc. As an example, the planning component may determine a time that represents the time gap between a state of the vehicle along the candidate action to the state being evaluated or the interaction region. The time gap may be determined based on a distance to the state being evaluated or to the interaction region and a velocity of the vehicle.

The techniques described herein can improve the functioning, safety, and efficiency of the autonomous and semi-autonomous vehicles operating in various driving environments. Determining a deviations to the object trajectories can allow planning systems to evaluate a larger range of possible object actions. Evaluating such deviations may provide the planning system a more robust and/or accurate understanding of the possible actions the objects may perform proximate the vehicle.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for determining adversarial cost(s) based on trajectory deviations. As shown in this example, some or all of the operations in the example process 100 may be performed by a perception component, prediction component, a planning component 102, and/or any other component or system within an autonomous vehicle. As described below in more detail, the planning component 102 may include various components, such as a deviation generating component, trajectory generating component, a trajectory cost component, and/or a trajectory determining component.

At operation 104, the planning component 102 may input candidate action(s) into a tree structure. In some examples, the planning component 102 may generate one or more candidate actions that lead the vehicle through an environment. As noted above, the candidate actions may be trajectories. When determining which of the candidate actions to follow, the planning component may input such candidate actions into a tree structure and generate costs to associate with such actions. For example, box 106 illustrates candidate actions in a tree structure. In this example, box 106 includes a candidate action 108, a candidate action 110, and a candidate action 112. The candidate action 108 may instruct the vehicle to navigate is a left direction, the candidate action 110 may instruct the vehicle to navigate in a straight direction, and the candidate action 112 may instruct the vehicle to navigate in a right direction. As shown, the candidate actions may be represented in a tree structure. That is, the candidate actions may start from a root node 114 which may represent the current location of the vehicle. Further, each candidate trajectory may include various nodes (or states) which may represent a vehicle state at various locations and/or times along the candidate trajectories. Of course, this example is not intended to be limiting; in other examples, there may be more or fewer candidate actions and there may be more or fewer nodes associated with some or all of the candidate actions.

At operation 116, the planning component 102 may receive a prediction sample. That is, when evaluating the candidate actions in the tree structure, the planning component 102 may evaluate likely driving scenarios. In some examples, a prediction component may generate samples that represent scenarios proximate the vehicle. The prediction component may send the samples (or scenarios) the planning component 102 such that the planning component 102 may evaluate the sample(s) when determining which candidate action to follow at a specific node in the tree structure. For example, the box 118 illustrates a driving scenario. In this example, the box 118 includes the vehicle 120 and an object 122. As shown, the object 122 may be a cyclist; however, in other examples, the object 122 may be any other type of dynamic object. In this example, the sample shown in box 118 may include the vehicle 120 following the candidate action 110 that instructs the vehicle 120 to continue straight and the object 122 following an object trajectory 124 that predicts the object 122 will continue straight.

At operation 126, the planning component 102 may determine deviation(s) based on an object trajectory in the sample. That is, to increase the number and/or type of object trajectories the planning component 102 evaluates, the planning component 102 may determine deviating trajectories (or adversarial trajectories) that are different than the object trajectory. As noted above, the deviating trajectories may be explicit trajectories or implicit trajectories. In some examples, the planning component 102 may generate lateral and/or longitudinal deviations. The deviations may start (or extend) from any position along the object trajectories. For example, box 128 illustrates a lateral deviating trajectory. In this example, the box 128 may include the deviating trajectory 130 which may deviate from the object trajectory 124. As shown, the deviating trajectory 130 may indicate that the object 122 can perform a lane changing maneuver to a driving lane occupied by the vehicle 120. However, this example is not intended to be limiting; in other examples, the planning component 102 may generate longitudinal deviations.

At operation 132, the planning component 102 may determine adversarial cost(s) based on a candidate action and various sub-cost evaluations associated with a potential deviation. That is, the planning component 102 may determine adversarial cost(s) associated with the candidate actions as described in box 106. The planning component 102 may generate the adversarial cost(s) by using Equation 1 described above. That is, the planning component 102 may determine a probability that the object 122 is an adversarial object, a feasibility of the object 122 navigating the deviating trajectory 130, a probability that the vehicle 120 can avoid a collision with the object 122 if the object 122 follows the deviating trajectory 130, a probability of a collision, a severity of the collision, etc. For example, box 134 illustrates a table illustrating various metrics which may be combined into the adversarial cost. In this example, the table may include a column representing a probability that the object is adversarial which may be 0.1, a column representing the feasibility of the deviating trajectory 130 which may be 0.7, a column representing the probability that the vehicle 120 has (or does not have) a contingency action which may be 0.1, a column representing a probability of collision which may be 0.4, and/or a column associated with a severity of the collision which may be 0.7. As described above, the planning component 102 may combined these metrics to generate the adversarial cost. Additional describe regarding generating the adversarial cost(s) and the associated sub-metrics is discussed in FIG. 2. As described throughout, the vehicle 120 may be controlled based on the adversarial cost.

Figure 2:
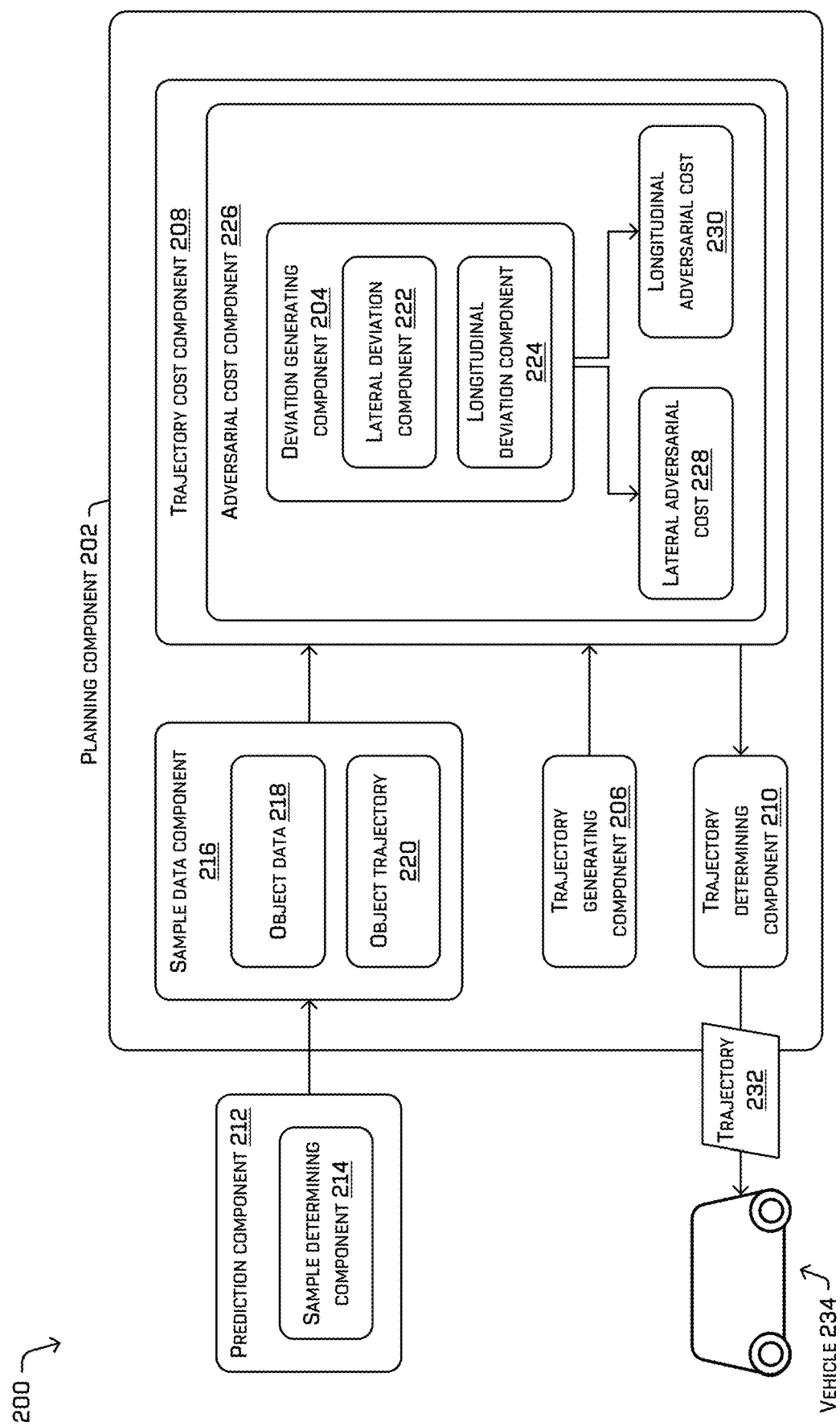
FIG. 2 illustrates an example computing system including a planning component configured to determine a control trajectory for a vehicle to follow based on generating adversarial cost(s) using one or more deviating trajectories, in accordance with one or more examples of the disclosure.

FIG. 2 illustrates an example computing system 200 including a planning component 202 configured to determine a control trajectory for a vehicle to follow based on generating adversarial cost(s) using one or more deviating trajectories.

In some examples, the planning component 202 may be similar or identical to the planning component 102 described above, or in any other examples herein. As noted above, in some cases the planning component 202 may be implemented within an autonomous vehicle. In some examples, the planning component 202 may include various components, described below, configured to perform different functionalities of a technique to determine adversarial cost(s) which may be used to determine actions for a vehicle to perform. In some examples, the planning component 202 may include a deviation generating component 204 configured to generate deviating trajectories, a trajectory generating component 206 configured to generate one or more candidate trajectories (or actions) throughout the environment, a trajectory cost component 208 configured to generate a cost associated with following a candidate trajectory, and/or a trajectory determining component 210 configured to determine a trajectory for the vehicle to follow through the environment.

In some examples, the planning component 202 may receive prediction samples (or scenarios) from a prediction component 212. As described in FIG. 5, the prediction component 212 may be component configured to predict future actions of the one or more objects proximate the vehicle. The prediction component 212 may be an active or passive prediction component. As shown, the prediction component 212 may include a subcomponent called the sample determining component 214 configured to generate, filter, and/or send samples to the sample data component 216. That is, the sample determining component 214 may generate predicted object trajectories, determine scenario(s) based on such object trajectories, rank the driving scenarios according to which scenario is most likely to occur, and/or identify the n-highest ranked predicted samples (or scenarios). In such cases, the sample determining component 214 may send the n-highest samples to the sample data component 216.

In some examples, the sample data component 216 may receive, store, synchronize, and/or evaluate samples. As shown, the sample data component 216 may include subcomponents such as the object data component 218 and the object trajectory component 220. The object data component 218 may be configured to receive, store, synchronize, and/or evaluate the object data within a sample. Object data may include object type, object location, object pose, object velocity, object acceleration, etc. The object trajectory component 220 may be configured to receive, store, synchronize, and/or evaluate the predicted object trajectories in the samples. As shown, the sample data component 216 may send the samples to the deviation generating component 204 and/or the trajectory cost component 208.

In some examples, the planning component 202 may include a trajectory generating component 206 configured to generate one or more candidate trajectories (or actions). The trajectory generating component 206 may receive sensor data indicative of the current driving scenario. The trajectory generating component 206 may use such sensor data to generate candidate actions (or trajectories) through the environment. As shown, the trajectory generating component 206 may send candidate action data to the trajectory cost component 208.

In some examples, the planning component 202 may include a trajectory cost component 208 configured to generate a cost associated with following a candidate trajectory. The trajectory cost component 208 may receive the candidate actions and/or the laterally and/or longitudinally deviating object trajectories. In some examples, the trajectory cost component 208 may generate a tree structure that includes some or all of the trajectories. The purpose of the tree structure is to enable the vehicle to evaluate the candidate actions at each state of the vehicle and to determine a control trajectory for the vehicle to follow based on such candidate trajectories. The tree structure may include an initial node (e.g., root node) which represents the state of the vehicle. Multiple candidate actions may extend from the initial node. In such instances, the trajectory cost component 208 may determine a traversal path based on the candidate actions that results in the traversal path having a lowest determined overall cost. To determine the lowest overall cost, the trajectory cost component 208 may determine one or more sub-costs that may be combined into the overall cost.

As shown, the trajectory cost component 208 may include an adversarial cost component 226 configured to generate (or determine) one or more adversarial cost(s) associated with the candidate actions and the deviating trajectories. As shown, the adversarial cost component 226 may include a deviation generating component 204, a lateral adversarial cost component 228, and a longitudinal adversarial cost component 230.

In some examples, the deviation generating component 204 configured to determine implicit deviating trajectories. The deviation generating component 204 may include sub-components called the lateral deviation component 222 and the longitudinal deviation component 224. The lateral deviation component 222 may be configured to determine implicit adversarial trajectories that deviate laterally from the predicted object trajectory in the sample. That is, the lateral deviation component 222 may receive the prediction sample and identify an object trajectory associated therewith. In such cases, the lateral deviation component 222 may determine (or generate) a laterally deviating trajectory that extends laterally from any position along the object trajectory in a direction towards to the candidate actions of the vehicle. That is, the lateral deviation component 222 may generate laterally deviating trajectories that are likely to be adversarial to the candidate actions of the vehicle. In other examples, the longitudinal deviation component 224 may be configured to determine (or generate) implicit trajectories that deviated longitudinally from the predicted object trajectory in the sample. That is, the longitudinal deviation component 224 may determine an implicit trajectory that modifies the longitudinal components (e.g., velocity, acceleration, etc.) of the predicted object trajectory. The longitudinally deviating trajectory may alter the time in which the object and the vehicle interact.

In some examples, the lateral adversarial cost component 228 may be configured to determine an adversarial cost associated with the lateral deviations generated by the lateral deviation component 222. The lateral adversarial cost component 228 may generate the adversarial cost using Equation 1 described above. Further, the longitudinal adversarial cost component 230 may be configured to determine an adversarial cost associated with the longitudinal deviations generated by the longitudinal deviation component 224. The longitudinal adversarial cost component 230 may generate the adversarial cost using Equation 1 described above.

In some examples, the planning component 202 may include a trajectory determining component 210 configured to determine a trajectory for the vehicle to follow through the environment. The trajectory determining component 210 may receive candidate action data and/or the associated cost(s) from the trajectory cost component 208. In such instances, the trajectory determining component 210 may determine an overall cost based on combining the adversarial cost(s) with the one or more other sub-costs (e.g., progress cost, lane ending cost, lane blocking cost, etc.) into a single overall cost. The vehicle may determine to follow a control trajectory that has the lowest overall cost compared to the overall costs of the other potential traversal paths between the candidate trajectories. The trajectory determining component 210 may send the trajectory 232 to the vehicle 234 for the vehicle 234 to follow. In such instances, upon receiving the trajectory 232, the vehicle 234 may be controlled, based on the instructions included in the trajectory 232, to follow the trajectory 232 throughout the environment.

Figure 3:
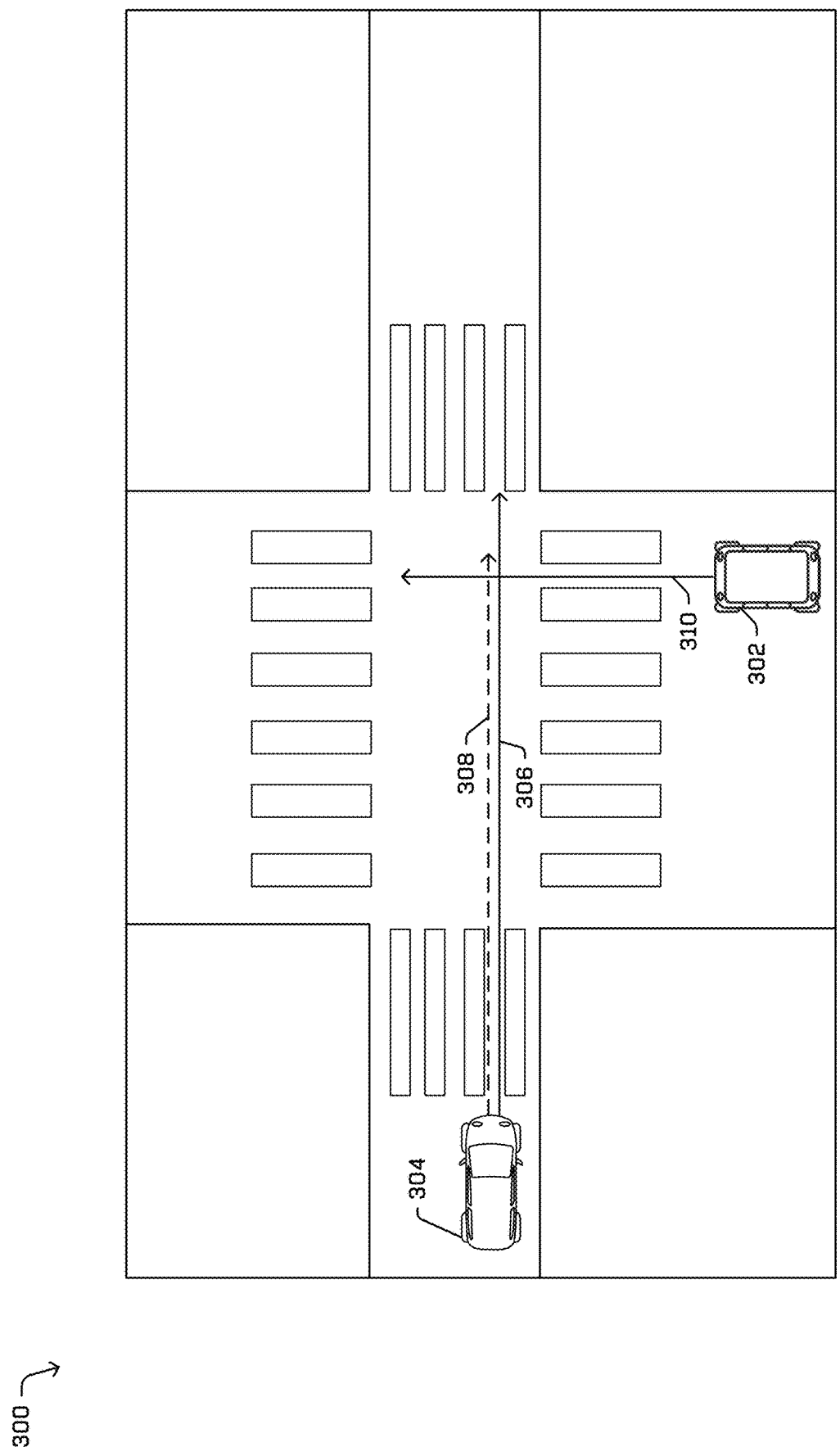
FIG. 3 illustrates an example environment including an object trajectory and a longitudinally deviated trajectory, in accordance with one or more examples of the disclosure.

FIG. 3 illustrates an example environment 300 including an object trajectory 306 and a longitudinally deviated trajectory 308.

In this example, the example environment 300 may include a vehicle 302 approaching a junction. As shown, the vehicle 302 may be following a trajectory 310 that instructs the vehicle 302 to navigate straight through the junction. Further, the example environment 300 may include an object 304 that is approaching the junction. As shown, the object 304 may be a vehicle; however, in other examples, the object 304 may be any other type of dynamic object. In this example, the object 304 may include an object trajectory 306 that instructs the object 304 to navigate straight through the junction. The object trajectory 306 may predict that the object 304 may interact (or collide) with the vehicle 302. However, as discussed throughout, the planning component may generate deviations of the object trajectory 306 such that the planning component may evaluate the quality of the trajectory 310 based on the collision occurring at different times. As such, the planning component may generate the longitudinally deviated trajectory 308 based on the object trajectory 306. Though FIG. 3 shows the longitudinally deviated trajectory 308 being laterally adjacent to the object trajectory 306, this may be for illustrative effects. That is, the longitudinally deviated trajectory 308 may be along same or similar lateral coordinates as the object trajectory 306. In this example, the length of the lines representing the trajectories may illustrate how far the object 304 will travel based on following the controls of the trajectory. As such, the object 304 is predicted to travel further by following the object trajectory 306 than by following the longitudinally deviated trajectory 308. That is, the planning component may have generated the longitudinally deviated trajectory 308 by decreasing the acceleration and/or velocity from that of the object trajectory 306. As such, the collision between the object 304 and the vehicle 302 may occur at a different time when the object 304 follows the object trajectory 306 than it would when the object 304 follows the longitudinally deviated trajectory 308. As described above, the planning component may evaluate both trajectories when determining the adversarial costs.

Figure 4:
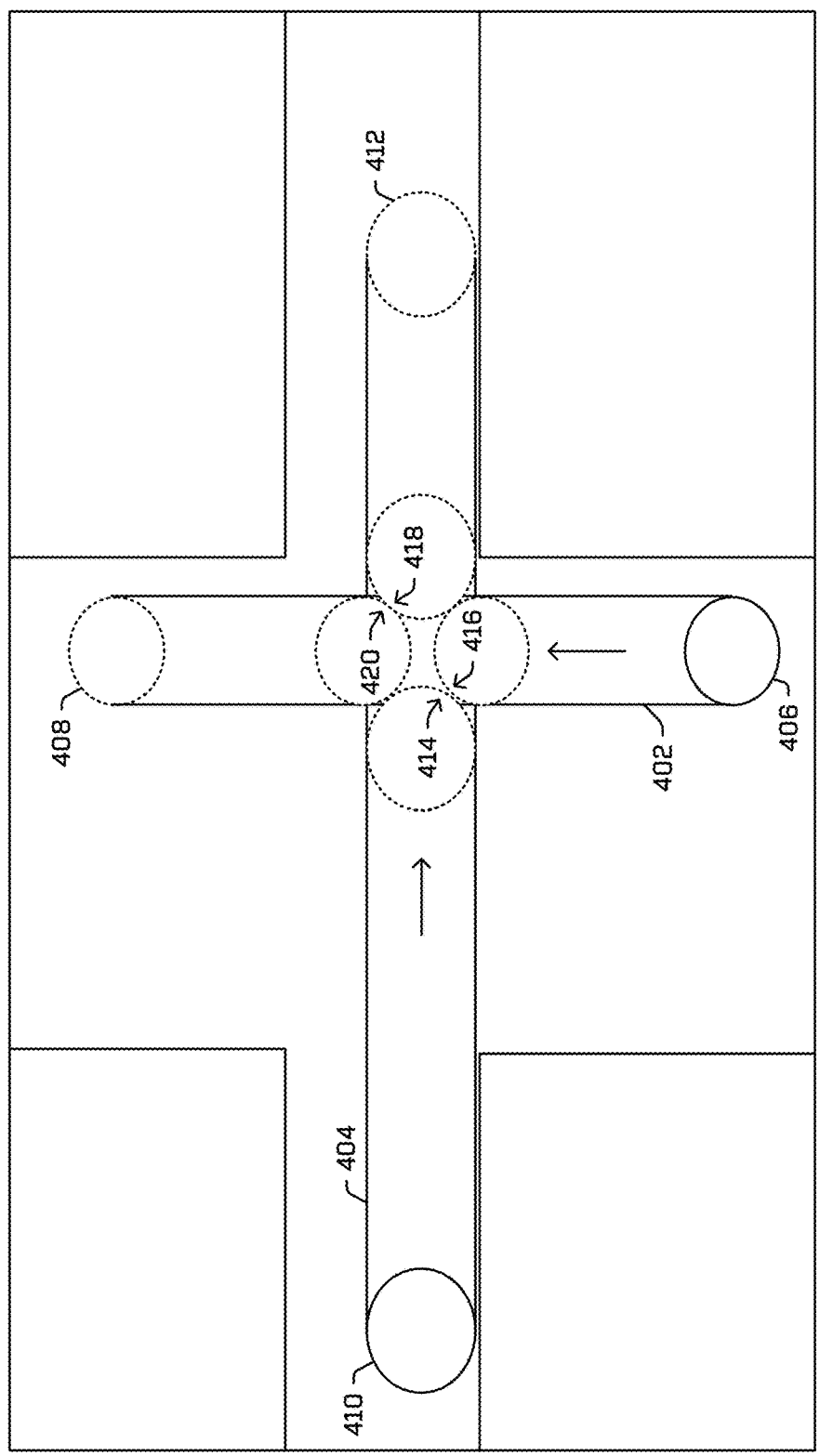
FIG. 4 illustrates an example environment including multiple capsules used to generate the longitudinal adversarial cost, in accordance with one or more examples of the disclosure.

FIG. 4 illustrates an example environment 400 including multiple capsules used to generate the longitudinal adversarial cost.

In this example, FIG. 4 may include a capsule 402 and a capsule 404. As noted above, the planning component may generate the capsules to identify an interaction region which may be used to determine the adversarial cost. As shown, when generating the capsules, the planning component may generate a constant curvature trajectory extending between two nodes of the vehicle trajectory or the object deviating trajectory, replace the vehicle (e.g., vehicle 302) and the object (e.g., 304) with circles, and/or generate a capsule that is the width of the diameter of the circles along the constant curvature trajectory.

For example, the circle 406 may represent a location of the vehicle along a candidate action. Further, the circle 408 may represent a state of the vehicle along the candidate action at a later time than the state of the circle 406. As such, the planning component may generate a constant curvature trajectory (not shown) extending between such states. In some examples, a constant curvature trajectory refers to a trajectory segment that has a same sign of curvature (or a same curvature value) throughout the segment. Based on the constant curvature trajectory, the planning component may generate a capsule based on the constant curvature trajectory. That is, the planning component may associate the circle 406 with start location of the constant curvature path and extend the circle to the ending state of the constant curvature path. The planning component may perform similar operations when generating the capsule associated with the object deviating trajectory. That is, the planning component may identify a first state of the longitudinally deviating trajectory that is at the same time as the state represented by the circle 406. Further, the planning component may identify a second state of the longitudinally deviating trajectory that is at the same time as the state represented by the circle 408. The planning component may generate a constant curvature trajectory between the first and second states. Based on the constant curvature trajectory, the planning component may place a circle 410 at the starting point of the constant curvature trajectory and extend the circle to the ending state of the constant curvature path as represented by the circle 412.

Based on generating the two capsules, the planning component may identify the interaction region. As noted above, the interaction region may be defined by one or more starting points and one or more ending points. The starting point(s) may be defined by the location at which the leading edge 414 of the circle 410 intersects with the leading edge 416 of the circle 406. That is, the starting point(s) may represent a location of the soonest potential collision. Further, the ending point(s) may be defined by the location at which the trailing edge 418 of the circle 410 stops overlapping (or intersecting) with the trailing edge 420 of the circle 406. Based on the starting and ending points, the planning component may determine the adversarial cost using Equation 1 as discussed above.

Though FIG. 4 illustrates a single circle being associated with (or assigned to) a vehicle or object, in other examples, the planning component may place multiple circles to represent the vehicle or object. Further, in other examples, the planning component may use different shapes (e.g., squares, rectangles, polygons, etc.) in place of the circle. In such cases, using additional shapes to represent the vehicle or object and/or different types of shapes may change the location(s) of the entry and ending points of the interaction region.

Figure 5:
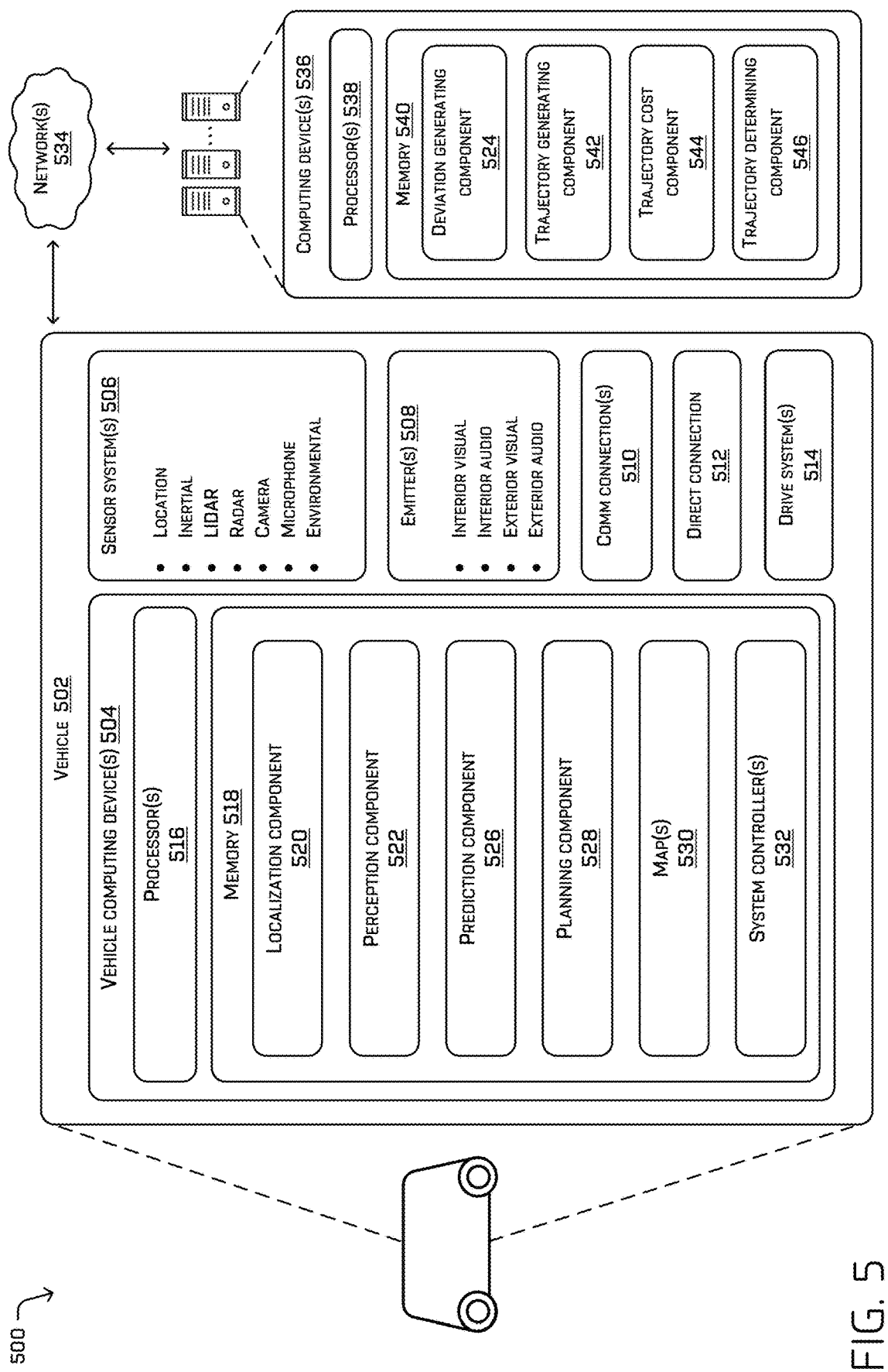
FIG. 5 depicts a block diagram of an example system for implementing various techniques described herein.

FIG. 5 is a block diagram of an example system 500 for implementing the techniques described herein. In at least one example, the system 500 may include a vehicle, such as vehicle 502. The vehicle 502 may include one or more vehicle computing devices 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the processor(s) 516. In the illustrated example, the vehicle 502 is an autonomous vehicle; however, the vehicle 502 could be any other type of vehicle, such as a semi-autonomous vehicle, or any other system having at least an image capture device (e.g., a camera-enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In the illustrated example, the memory 518 of the vehicle computing device 504 stores a localization component 520, a perception component 522, a prediction component 526, a planner component 528, one or more system controllers 532, and one or more maps 530 (or map data). Though depicted in FIG. 5 as residing in the memory 518 for illustrative purposes, it is contemplated that the localization component 520, the perception component 522, the prediction component 526, the planner component 528, system controller(s) 532, and/or the map(s) may additionally, or alternatively, be accessible to the vehicle 502 (e.g., stored on, or otherwise accessible by, memory remote from the vehicle 502, such as, for example, on memory 540 of one or more computing device 536 (e.g., a remote computing device)). In some examples, the memory 540 may include a deviation generating component 524, a trajectory generating component 542, a trajectory cost component 544, and/or a trajectory determining component 546.

In at least one example, the localization component 520 may include functionality to receive sensor data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530, and may continuously determine a location and/or orientation of the vehicle 502 within the environment. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 502. In some instances, the localization component 520 may provide data to various components of the vehicle 502 to determine an initial position of the vehicle 502 for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 526 may generate one or more probability maps representing prediction probabilities of possible locations of one or more objects in an environment. For example, the prediction component 526 may generate one or more probability maps for vehicles, pedestrians, animals, and the like within a threshold distance from the vehicle 502. In some instances, the prediction component 526 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 526 may generate predicted trajectories of objects (e.g., objects) in an environment. For example, the prediction component 526 may generate one or more predicted trajectories for objects within a threshold distance from the vehicle 502. In some examples, the prediction component 526 may measure a trace of an object and generate a trajectory for the object based on observed and predicted behavior.

In general, the planner component 528 may determine a path for the vehicle 502 to follow to traverse through an environment. For example, the planner component 528 may determine various routes and trajectories and various levels of detail. For example, the planner component 528 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 528 may generate an instruction for guiding the vehicle 502 along at least a portion of the route from the first location to the second location. In at least one example, the planner component 528 may determine how to guide the vehicle 502 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 528 may select a trajectory for the vehicle 502.

In other examples, the planner component 528 may alternatively, or additionally, use data from the localization component 520, the perception component 522, and/or the prediction component 526 to determine a path for the vehicle 502 to follow to traverse through an environment. For example, the planner component 528 may receive data (e.g., object data) from the localization component 520, the perception component 522, and/or the prediction component 526 regarding objects associated with an environment. In some examples, the planner component 528 receives data for relevant objects within the environment. Using this data, the planner component 528 may determine a route to travel from a first location (e.g., a current location) to a second location (e.g., a target location) to avoid objects in an environment. In at least some examples, such a planner component 528 may determine there is no such collision-free path and, in turn, provide a path that brings vehicle 502 to a safe stop avoiding all collisions and/or otherwise mitigating damage. The planner component 528 may perform any of the techniques described with respect to any of FIGS. 1-4 above with respect to determining candidate trajectories to follow based on lane change cost values.

In at least one example, the vehicle computing device 504 may include one or more system controllers 532, which may be configured to control steering, propulsion, braking, safety, emitters, communication, and other systems of the vehicle 502. The system controller(s) 532 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 526, and/or the planner component 528 to determine a location of the vehicle 502, detect objects in an environment, generate routes, determine actions and/or trajectories to navigate within an environment.

In some examples, the one or more maps 530 may be stored on a remote computing device(s) (such as the computing device(s) 536) accessible via network(s) 534. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

In some instances, aspects of some or all of the components discussed herein may include any models, techniques, and/or machine-learned techniques. For example, in some instances, the components in the memory 518 (and the memory 540, discussed below) may be implemented as a neural network.

As described herein, an exemplary neural network is a technique that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include Mobilenet V2, Shufflenet, Channelnet, Peleenet, and/or the like. The ML model may comprise a residual block such as Pixor, in some examples.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors. For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 534, to the one or more computing device(s) 536 at a particular frequency, after a lapse of a predetermined period of time, in near real-time, etc.

The vehicle 502 may also include one or more emitters 508 for emitting light and/or sound. The emitter(s) 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device 536, other nearby vehicles, etc.) and/or one or more remote sensor system(s) for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 534. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the prediction component 526, the planner component 528, the one or more system controllers 532, and the one or more maps 530 may process sensor data, as described above, and may send their respective outputs, over the one or more network(s) 534, to the computing device(s) 536. In at least one example, the localization component 520, the perception component 522, the prediction component 526, the planner component 528, the one or more system controllers 532, and the one or more maps 530 may send their respective outputs to the computing device(s) 536 at a particular frequency, after a lapse of a predetermined period of time, in near real-time, etc.

In some examples, the vehicle 502 may send sensor data to the computing device(s) 536 via the network(s) 534. In some examples, the vehicle 502 may receive sensor data from the computing device(s) 536 and/or remote sensor system(s) via the network(s) 534. The sensor data may include raw sensor data and/or processed sensor data and/or representations of sensor data. In some examples, the sensor data (raw or processed) may be sent and/or received as one or more log files.

The computing device(s) 536 may include processor(s) 538 and a memory 540, which may include a deviation generating component 524, a trajectory generating component 542, a trajectory cost component 544, and/or a trajectory determining component 546. In some examples, the memory 540 may store one or more of components that are similar to the component(s) stored in the memory 518 of the vehicle 502. In such examples, the computing device(s) 536 may be configured to perform one or more of the processes described herein with respect to the vehicle 502. In some examples, the deviation generating component 524, the trajectory generating component 542, the trajectory cost component 544, and/or the trajectory determining component 546 may perform substantially similar functions as the planner component 528.

The processor(s) 516 of the vehicle 502 and the processor(s) 538 of the computing device(s) 536 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 540 are examples of non-transitory computer-readable media. The memory 518 and memory 540 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 6:
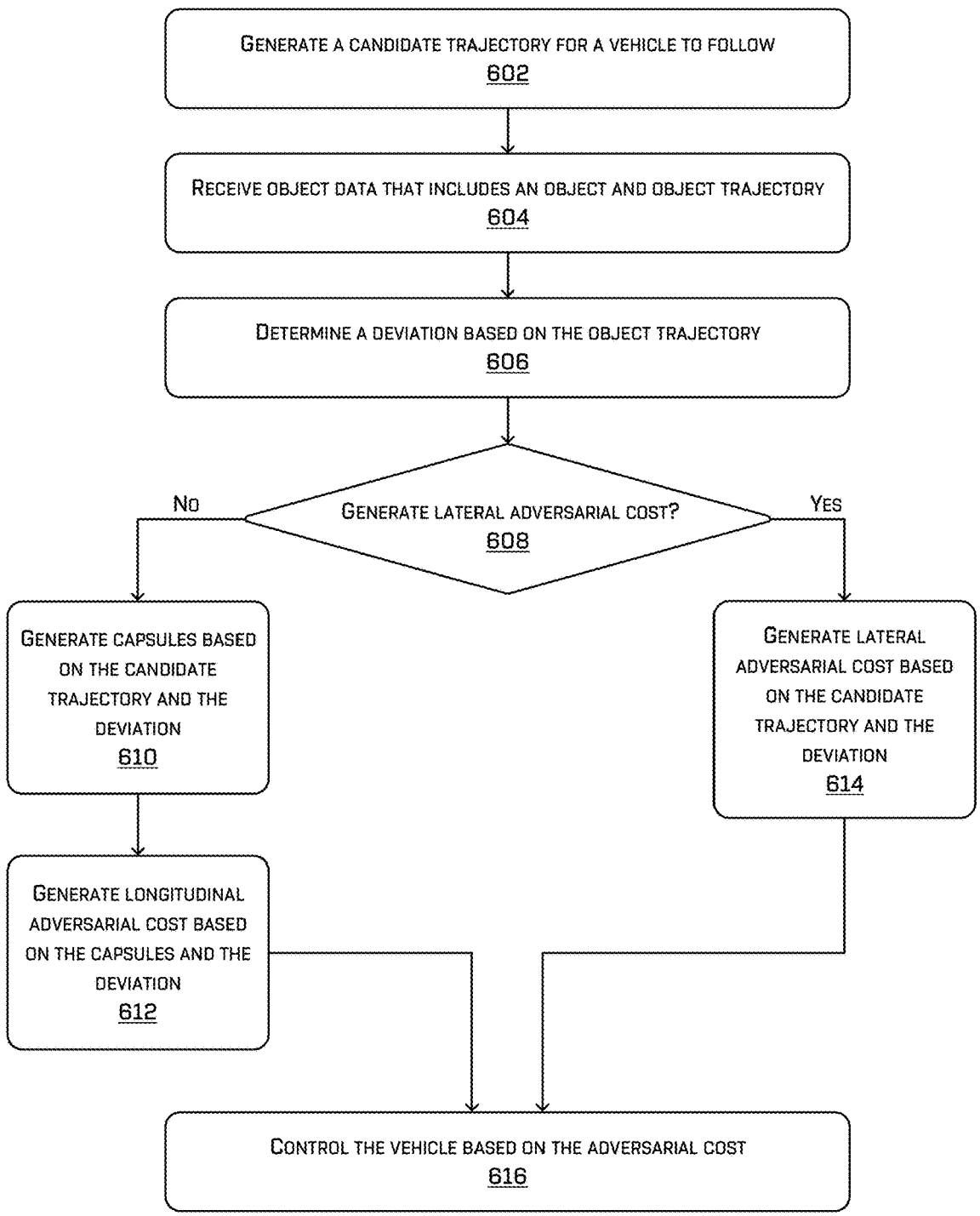
FIG. 6 is a flow diagram illustrating an example process for receiving an object trajectory, modifying the object trajectory, generating a lateral and/or longitudinal adversarial cost, and controlling a vehicle based on the lateral and/or longitudinal adversarial cost, and control the vehicle based on the lane change cost, in accordance with one or more examples of the disclosure.

FIG. 6 is a flow diagram illustrating an example process 600 for receiving an object trajectory, modifying the object trajectory, generating a lateral and/or longitudinal adversarial cost, and controlling a vehicle based on the lateral and/or longitudinal adversarial cost. As described below, the example process 600 may be performed by one or more computer-based components configured to implement various functionalities described herein. For instance, process 600 may be performed by a planning component 202. As described above, the planning component 202 may be integrated as an on-vehicle system in some examples. However, in other examples, the planning component 202 may be integrated as a separate server-based system.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the planning component may generate a candidate trajectory for a vehicle to follow. That is, the planning component may generate one or more candidate actions. A candidate action may be a trajectory that includes a spatial representation of future movements of the vehicle in addition to one or more vehicle controls (e.g., velocity, acceleration, yaw, steering angle, etc.). That is, the candidate actions may include instructions that instruct the vehicle as to how to navigate a portion of the environment. The candidate actions can include instructions that cause the vehicle to perform a combination of various types of actions, such as remain in the same lane, lane change left, lane change right, pass an object proximate the vehicle, modify vehicle kinematics (e.g., velocity, acceleration, etc.), and/or any other type of action. In some examples, a candidate action may include multiple predicted states that can represent the state information of the vehicle at a specific location along the candidate action. State information may include location data, pose data (e.g., lateral offset data, longitudinal offset data, heading offset data), velocity data, acceleration data, and/or other types of data.

At operation 604, the planning component may receive object data that includes an object and object trajectory. In some examples, the planning component may receive prediction sample scenarios from a prediction component of the vehicle. A sample may be a candidate scenario in which some or all objects in the sample have a single candidate trajectory. In some examples, the prediction component may predict object trajectories and generate samples based on such predicted trajectories. That is, the prediction component may generate different samples (e.g., candidate scenarios) and determine which samples are the most likely to occur. For example, the prediction component may evaluate such samples and send the n-highest ranked (where a high rank is indicative of a high likelihood of occurring) samples to the planning component.

At operation 606, the planning component may a deviation based on the object trajectory. When modifying the object trajectory, the planning component may determine lateral deviations extending from an object trajectory in the sample received from the prediction component. A lateral deviation or deviating trajectory may be an explicit or implicit trajectory or path with a constant curvature that extends from a location (or position) along the object trajectory to a state of a candidate action. The planning component may generate deviations that would be adversarial if the object deviates from the object trajectory in the sample. That is, the planning component may limit the directions in which the deviations are generated to the direction of the candidate action.

In some examples, the planning component may generate one or more implicit lateral deviations for some or all object trajectories in a sample. That is, the planning component may identify an object trajectory in the sample. The planning component may generate one or more lateral deviations extending from a location along the object trajectory to a state of the candidate action that is being evaluated. When generating the deviation, the planning component may generate the deviation from a prior state (e.g., state with a timestamp that is before the timestamp of the state of candidate action being evaluated) of the object trajectory. That is, as described above, when evaluating candidate actions in a tree structure, the planning component may evaluate nodes at different action layers or timesteps. For example, a root node may correspond to a current time and at the current location of the vehicle. In this case, when determining the lateral deviation, the planning component may generate a lateral deviation extending from the current location (or state) of the object to the current position of the vehicle. However, when evaluating a different node at a different action layer of the tree structure, for example the node at three seconds into the future, the planning component can generate a lateral deviation extending from a state of the object trajectory at the current time to the node of the candidate action at three seconds, a lateral deviation extending from a state of the object trajectory at one second in the future to the node of the candidate action at three seconds, etc. In some examples, the planning component may generate one or more deviations from different locations (or states) along the object trajectory that extend to a node being currently evaluated in the tree search.

Additionally or alternatively, the planning component may generate implicit longitudinal deviations from the object trajectory of the sample received from the prediction component. A longitudinal deviation or longitudinal deviating trajectory may be an explicit or implicit trajectory or path that does not deviate laterally from the object trajectory but deviates longitudinally by modifying the acceleration, velocity, etc. of the object trajectory. Generating longitudinally deviating trajectories may modify the timing of the potential collision from the timing of a potential collision based on the object trajectory. Similar to the lateral deviations, the planning component may generate the longitudinal deviation by modifying the longitudinal kinematics of the vehicle starting at any state (or position) of the object trajectory.

At operation 608, the planning component may determine whether to generate the lateral adversarial cost or whether to generate the longitudinal adversarial cost. If the planning component is not generating a lateral adversarial cost (608: No), the planning component may determine a longitudinal adversarial cost. That is, at operation 610, the planning component may generate capsules based on the candidate trajectory and the deviation (or adversarial trajectory).

For example, the planning component may generate a trajectory extending between two states of the candidate action. That is, the trajectory may be a constant curvature trajectory that spans between two different states of the candidate action. The planning component may generate a first trajectory extending between two states of the candidate action of the vehicle and a second trajectory extending between two states of the longitudinal deviation. For instance, the planning component may identify a state of the candidate action currently being evaluated in the tree structure. Further, the planning component may identify, at the same timestep as the state being evaluated, a state of the object based on the longitudinal deviation. For example, the state being evaluated may be a state five seconds in the future and as such, the planning component may identify the object state that is five seconds in the future. Next, the planning component may identify a previous state of the candidate action and a previous state of the object at the same or different timestep. For instance, the planning component may identify a candidate action state at two seconds into the future which would ultimately be three seconds before the state currently being evaluated (e.g., which is at five seconds in the future). However, this is not intended to be limiting; in other examples, the planning component may select (or identify) any state prior to the evaluation state. There may, however, be benefits to selecting a state that is close to the evaluation state because the uncertainty of the environment may grow the larger the gap between states.

Based on identifying the two candidate action states and the two corresponding longitudinal deviation states, the planning component may generate a candidate trajectory (or path) between such states. That is, the planning component may generate a candidate trajectory that extends between the candidate action state at three seconds in the future to the candidate action state at five seconds in the future. Further, the planning component may generate a candidate trajectory that extends between the longitudinal deviation state at three seconds in the future to a longitudinal deviation state at five seconds in the future. As noted above, the candidate trajectories may be a constant curvature trajectory.

In some examples, the planning component may generate two capsules based on the candidate trajectories. A capsule may be an enclosed region representing the area of the environment that the vehicle and object are predicted to occupy based on following the candidate trajectories. The planning component may generate a capsule for the vehicle candidate trajectory and a separate (and different) capsule for the object candidate trajectory. When generating the capsule, the planning component may place a circle representative of the size of the vehicle over the previous state at three seconds into the future. The planning component may then generate the capsule that is the width of the circle diameter and extends along the candidate trajectory (e.g., from three seconds in the future to five seconds in the future). The planning component may perform similar operations to generate the capsule for the object.

At operation 612, the planning component may generate a longitudinal adversarial cost based on the capsules and the modified object trajectory. Based on generating the capsules, the planning component may identify an interaction region. The interaction region may be a region of the environment that a collision may occur based on the candidate trajectories. Further, the interaction region may be defined by entry and exit points (or locations). The entry point may be the location at which the leading edge, as the circles moves from the first node (e.g., three seconds in the future) to the second node (e.g., five seconds in the future), of the vehicle circle intersects with the leading edge of the object circle. The exit point may be the location at which the trailing edge of the vehicle circle and the object circle stop (e.g., cease, fail to, lack, etc.) intersecting. The region between the entry and exit points may be the interaction region.

Based on identifying the interaction region, the planning component may determine a probability of the vehicle having (or not having) a contingency (e.g., $(1-P(\check{C}|A, H))$) and a probability of collision (e.g., $P(C|x^H(t_c), x^A(t_c|A))$). When determining such probabilities, the planning component may use similar techniques as described above with respect interaction region. For example, the planning component may determine a distance from the prior state (of the vehicle) to the interaction region and determine, based on the distance, state data (e.g., velocity, acceleration, steering angle, yaw, etc.), whether the vehicle could avoid the interaction region, as described above. Accordingly, the planning component may determine the longitudinal adversarial cost based on solving Equation 1.

In contrast, if the planning component is generating a lateral adversarial cost (608: Yes), the planning component may proceed to generate a lateral adversarial cost without generating the capsules described in operation 610. That is, at operation 614, the planning component may generate lateral adversarial cost based on the candidate trajectory and the deviation (or adversarial trajectory). When determining the lateral adversarial cost, the planning component may solve Equation 1 described above. That is, the lateral adversarial cost may be determined based on a combination of the probability that the object may conduct the lateral deviation, the feasibility, the probability of the vehicle having (or not having) a contingency, a probability of a collision, and/or a severity of the collision. In some examples, the planning component may associate the lateral adversarial cost with the candidate action being evaluated in the tree structure.

At operation 616, the planning component may control the vehicle based on the adversarial cost. Upon determining the adversarial cost(s) (e.g., lateral and/or longitudinal adversarial costs) and the one or more other sub-costs, the planning component may determine or otherwise combine the sub-costs into a single overall cost. In various examples, differing cost types may be associated with differing weights based on, for example, importance. As a non-limiting examples, a safety cost may be associated with a higher weight than a comfort cost. Further, such costs may be weighted differently, and as such, different costs may affect the overall cost in different proportions. In some examples, the vehicle may determine to follow a control trajectory that has the lowest overall cost compared to the overall costs of other potential traversal paths between the candidate trajectories.

In some examples, the vehicle may follow the control trajectory while operating within the environment. Upon determining the control trajectory from the tree search, the vehicle may follow the control trajectory throughout the environment. As such, the vehicle may be controlled based on the lateral and/or longitudinal adversarial cost(s).

EXAMPLE CLAUSES

A: A system comprising: one or more processors; and one or more non-transitory computer-readable media storing computer-executable instructions that, when executed, cause the system to perform operations comprising: generating a candidate trajectory for an autonomous vehicle to follow; receiving a candidate driving scenario that includes an object and a predicted object trajectory; determining, based at least in part on an adversarial trajectory that is different than the predicted object trajectory, an adversarial cost, wherein generating the adversarial cost comprises: determining, based on a type of the object, a degree of feasibility associated with the object following the adversarial trajectory determined to intersect with the autonomous vehicle; determining a first probability that the autonomous vehicle can avoid an interaction with the object following the adversarial trajectory; determining, based at least in part on the object following the adversarial trajectory and the autonomous vehicle following the candidate trajectory, a second probability of a collision; determining a third probability that the object is adversarial; determining a severity of the collision; and determining, based at least in part on the degree of feasibility, the first probability, the second probability, the third probability, and the severity of the collision, the adversarial cost associated with the candidate trajectory; and controlling the autonomous vehicle based at least in part on the adversarial cost.

B: The system of paragraph A, wherein the adversarial trajectory is a laterally deviated trajectory and the adversarial cost is a lateral adversarial cost, the operations further comprising: generating, based at least in part on the predicted object trajectory, a longitudinally deviated trajectory that is different than the predicted object trajectory; generating, based at least in part on the longitudinally deviated trajectory, a longitudinal adversarial cost; and controlling the autonomous vehicle based at least in part on the lateral adversarial cost and the longitudinal adversarial cost.

C: The system of paragraph A, wherein determining the second probability of collision is based at least in part on: determining a first portion of the candidate trajectory extending between two states of the candidate trajectory; determining a second portion of adversarial trajectory extending between two states of the adversarial trajectory; determining a first geometric area associated with the first portion and a second geometric area associated with the second portion, wherein the first geometric area and the second geometric area are different, the first geometric area representing a region of an environment that is predicted to be occupied based at least in part on the autonomous vehicle following the candidate trajectory associated with the first portion; and determining, based at least in part on the first geometric area and the second geometric area, the second probability of collision.

D: The system of paragraph C, wherein determining the second probability of collision is based at least in part on: identifying, based at least in part on the first geometric area and the second geometric area, an interaction region; determining a distance from a state of the candidate trajectory to the interaction region; determining, based at least in part on modifying a kinematic value of the autonomous vehicle, the distance, and kinematic constraints of the autonomous vehicle, a location of the autonomous vehicle relative to the interaction region; and determining, based at least in part on the distance and the location, the second probability.

E: The system of paragraph C, wherein: the first portion comprises a first constant curvature between the two states of the candidate trajectory; and the second portion comprises a second constant curvature between the two states of the adversarial trajectory.

F: One or more non-transitory computer-readable media storing instructions executable by one or more processors, wherein the instructions, when executed, cause a system to perform operations comprising: receiving a candidate trajectory for a vehicle to follow; receiving object data that includes an object and an object trajectory; determining a degree of feasibility associated with the object following an adversarial trajectory associated with the object trajectory; determining a first probability that the vehicle can avoid an interaction with the object following the adversarial trajectory; determining a second probability that the object is adversarial; determining a third probability of an interaction; and determining, based at least in part on the degree of feasibility, the first probability, the second probability, and the third probability, an adversarial cost associated with the candidate trajectory.

G: The one or more non-transitory computer-readable media of paragraph F, wherein the adversarial trajectory is a laterally deviated trajectory and the adversarial cost is a lateral adversarial cost, the operations further comprising: generating, based at least in part on the object trajectory, a longitudinally deviated trajectory that is different than the object trajectory; generating, based at least in part on the longitudinally deviated trajectory, a longitudinal adversarial cost; and controlling the vehicle based at least in part on the lateral adversarial cost and the longitudinal adversarial cost.

H: The one or more non-transitory computer-readable media of paragraph F, wherein the interaction is at least one of: a collision between the vehicle and the object, a distance between the object and the vehicle being below a threshold distance, or a time gap between the object and the vehicle being below a threshold time.

I: The one or more non-transitory computer-readable media of paragraph F, wherein determining the third probability of the interaction is based at least in part on: determining a first portion of the candidate trajectory extending between two states of the candidate trajectory; determining a second portion of the adversarial trajectory extending between two states of the adversarial trajectory; determining a first geometric area associated with the first portion and a second geometric area associated with the second portion, wherein the first geometric area and the second geometric area are different, the first geometric area representing a region of an environment that is predicted to be occupied based at least in part on the vehicle following the candidate trajectory associated with the first portion; and determining, based at least in part on the first geometric area and the second geometric area, the third probability of interaction.

J: The one or more non-transitory computer-readable media of paragraph I, wherein determining the third probability of interaction is based at least in part on: identifying, based at least in part on the first geometric area and the second geometric area, an interaction region; determining a distance from a state of the candidate trajectory to the interaction region; determining, based at least in part on modifying a kinematic value of the vehicle, the distance, and kinematic constraints of the vehicle, a location of the vehicle relative to the interaction region; and determining, based at least in part on the distance and the location, the second probability of collision.

K: The one or more non-transitory computer-readable media of paragraph I, wherein: the first portion comprises a first constant curvature between the two states of the candidate trajectory; and the second portion comprises a second constant curvature between the two states of the adversarial trajectory.

L: The one or more non-transitory computer-readable media of paragraph F, the operations further comprising: determining a collision metric representing a predicted severity level of a predicted collision, wherein determining the collision metric is based at least in part on at least one of: a relative velocity between the vehicle following the candidate trajectory and the object following the adversarial trajectory, or a relative heading between the vehicle following the candidate trajectory and the object following the adversarial trajectory.

M: The one or more non-transitory computer-readable media of paragraph F, wherein the adversarial cost is a first adversarial cost, wherein the adversarial trajectory is a first laterally deviated trajectory that extends from a first state of the object trajectory to a second state of the candidate trajectory, the operations further comprising: generating a second laterally deviated trajectory that extends from a third state of the object trajectory to the second state of the candidate trajectory, wherein the third state is at a different position along the object trajectory than the first state; generating, based at least in part on the second laterally deviated trajectory, a second adversarial cost; and controlling the vehicle based at least in part on the first adversarial cost and the second adversarial cost.

N: The one or more non-transitory computer-readable media of paragraph F, the operations further comprising: controlling the vehicle based at least in part on the adversarial cost.

O: A method comprising: receiving a candidate trajectory for a vehicle to follow; receiving object data that includes an object and an object trajectory; determining a degree of feasibility associated with the object following an adversarial trajectory associated with the object trajectory; determining a first probability that the vehicle can avoid an interaction with the object following the adversarial trajectory; determining a second probability that the object is adversarial; determining a third probability of an interaction; and determining, based at least in part on the degree of feasibility, the first probability, the second probability, and the third probability, an adversarial cost associated with the candidate trajectory.

P: The method of paragraph O, wherein the adversarial trajectory is a laterally deviated trajectory and the adversarial cost is a lateral adversarial cost, further comprising: generating, based at least in part on the object trajectory, a longitudinally deviated trajectory that is different than the object trajectory; generating, based at least in part on the longitudinally deviated trajectory, a longitudinal adversarial cost; and controlling the vehicle based at least in part on the lateral adversarial cost and the longitudinal adversarial cost.

Q: The method of paragraph O, wherein the interaction is at least one of: a collision between the vehicle and the object, a distance between the object and the vehicle being below a threshold distance, or a time gap between the object and the vehicle being below a threshold time.

R: The method of paragraph O, wherein determining the third probability of the interaction is based at least in part on: determining a first portion of the candidate trajectory extending between two states of the candidate trajectory; determining a second portion of the adversarial trajectory extending between two states of the adversarial trajectory; determining a first geometric area associated with the first portion and a second geometric area associated with the second portion, wherein the first geometric area and the second geometric area are different, the first geometric area representing a region of an environment that is predicted to be occupied based at least in part on the vehicle following the candidate trajectory associated with the first portion; and determining, based at least in part on the first geometric area and the second geometric area, the third probability of interaction.

S: The method of paragraph R, wherein determining the third probability of interaction is based at least in part on: identifying, based at least in part on the first geometric area and the second geometric area, an interaction region; determining a distance from a state of the candidate trajectory to the interaction region; determining, based at least in part on modifying a kinematic value of the vehicle, the distance, and kinematic constraints of the vehicle, a location of the vehicle relative to the interaction region; and determining, based at least in part on the distance and the location, the second probability of collision.

T: The method of paragraph R, wherein: the first portion comprises a first constant curvature between the two states of the candidate trajectory; and the second portion comprises a second constant curvature between the two states of the adversarial trajectory.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more non-transitory computer-readable media storing computer-executable instructions that, when executed, cause the system to perform operations comprising:
   generating a candidate trajectory for an autonomous vehicle to follow;
   receiving a candidate driving scenario that includes an object and a predicted object trajectory;
   determining, based at least in part on an adversarial trajectory that is different than the predicted object trajectory, an adversarial cost, wherein generating the adversarial cost comprises:
   determining, based on a type of the object, a degree of feasibility associated with the object following the adversarial trajectory determined to intersect with the autonomous vehicle;
   determining a first probability that the autonomous vehicle can avoid an interaction with the object following the adversarial trajectory;
   determining, based at least in part on the object following the adversarial trajectory and the autonomous vehicle following the candidate trajectory, a second probability of a collision;
   determining a third probability that the object is adversarial;
   determining a severity of the collision;
   determining, based at least in part on the degree of feasibility, the first probability, the second probability, the third probability, and the severity of the collision, the adversarial cost associated with the candidate trajectory; and
   controlling the autonomous vehicle based at least in part on the adversarial cost.

2. The system of claim 1, wherein the adversarial trajectory is a laterally deviated trajectory and the adversarial cost is a lateral adversarial cost, the operations further comprising:
   generating, based at least in part on the predicted object trajectory, a longitudinally deviated trajectory that is different than the predicted object trajectory;
   generating, based at least in part on the longitudinally deviated trajectory, a longitudinal adversarial cost; and
   controlling the autonomous vehicle based at least in part on the lateral adversarial cost and the longitudinal adversarial cost.

3. The system of claim 1, wherein determining the second probability of collision is based at least in part on:

determining a first portion of the candidate trajectory extending between two states of the candidate trajectory;

determining a second portion of adversarial trajectory extending between two states of the adversarial trajectory;

determining a first geometric area associated with the first portion and a second geometric area associated with the second portion, wherein the first geometric area and the second geometric area are different, the first geometric area representing a region of an environment that is predicted to be occupied based at least in part on the autonomous vehicle following the candidate trajectory associated with the first portion; and determining, based at least in part on the first geometric area and the second geometric area, the second probability of collision.

4. The system of claim 3, wherein determining the second probability of collision is based at least in part on:

identifying, based at least in part on the first geometric area and the second geometric area, an interaction region;

determining a distance from a state of the candidate trajectory to the interaction region;

determining, based at least in part on modifying a kinematic value of the autonomous vehicle, the distance, and kinematic constraints of the autonomous vehicle, a location of the autonomous vehicle relative to the interaction region; and determining, based at least in part on the distance and the location, the second probability.

5. The system of claim 3, wherein:

the first portion comprises a first constant curvature between the two states of the candidate trajectory; and the second portion comprises a second constant curvature between the two states of the adversarial trajectory.

6. One or more non-transitory computer-readable media storing instructions executable by one or more processors, wherein the instructions, when executed, cause a system to perform operations comprising:

receiving a candidate trajectory for a vehicle to follow;

receiving object data that includes an object and an object trajectory;

determining a degree of feasibility associated with the object following an adversarial trajectory associated with the object trajectory;

determining a first probability that the vehicle can avoid an interaction with the object following the adversarial trajectory;

determining a second probability that the object is adversarial;

determining a third probability of an interaction;

determining, based at least in part on the degree of feasibility, the first probability, the second probability, and the third probability, an adversarial cost associated with the candidate trajectory; and controlling the vehicle based at least in part on the adversarial cost.

7. The one or more non-transitory computer-readable media of claim 6, wherein the adversarial trajectory is a laterally deviated trajectory and the adversarial cost is a lateral adversarial cost, the operations further comprising:

generating, based at least in part on the object trajectory, a longitudinally deviated trajectory that is different than the object trajectory;

generating, based at least in part on the longitudinally deviated trajectory, a longitudinal adversarial cost; and controlling the vehicle based at least in part on the lateral adversarial cost and the longitudinal adversarial cost.

8. The one or more non-transitory computer-readable media of claim 6, wherein the interaction is at least one of:

a collision between the vehicle and the object, a distance between the object and the vehicle being below a threshold distance, or a time gap between the object and the vehicle being below a threshold time.

9. The one or more non-transitory computer-readable media of claim 6, wherein determining the third probability of the interaction is based at least in part on:

determining a first portion of the candidate trajectory extending between two states of the candidate trajectory;

determining a second portion of the adversarial trajectory extending between two states of the adversarial trajectory;

determining a first geometric area associated with the first portion and a second geometric area associated with the second portion, wherein the first geometric area and the second geometric area are different, the first geometric area representing a region of an environment that is predicted to be occupied based at least in part on the vehicle following the candidate trajectory associated with the first portion; and determining, based at least in part on the first geometric area and the second geometric area, the third probability of interaction.

10. The one or more non-transitory computer-readable media of claim 9, wherein determining the third probability of interaction is based at least in part on:

identifying, based at least in part on the first geometric area and the second geometric area, an interaction region;

determining a distance from a state of the candidate trajectory to the interaction region;

determining, based at least in part on modifying a kinematic value of the vehicle, the distance, and kinematic constraints of the vehicle, a location of the vehicle relative to the interaction region; and determining, based at least in part on the distance and the location, the second probability of collision.

11. The one or more non-transitory computer-readable media of claim 9, wherein:

the first portion comprises a first constant curvature between the two states of the candidate trajectory; and the second portion comprises a second constant curvature between the two states of the adversarial trajectory.

12. The one or more non-transitory computer-readable media of claim 6, the operations further comprising:

determining a collision metric representing a predicted severity level of a predicted collision, wherein determining the collision metric is based at least in part on at least one of:

a relative velocity between the vehicle following the candidate trajectory and the object following the adversarial trajectory, or a relative heading between the vehicle following the candidate trajectory and the object following the adversarial trajectory.

13. The one or more non-transitory computer-readable media of claim 6, wherein the adversarial cost is a first adversarial cost, wherein the adversarial trajectory is a first laterally deviated trajectory that extends from a first state of the object trajectory to a second state of the candidate trajectory, the operations further comprising:

generating a second laterally deviated trajectory that extends from a third state of the object trajectory to the second state of the candidate trajectory, wherein the third state is at a different position along the object trajectory than the first state;

generating, based at least in part on the second laterally deviated trajectory, a second adversarial cost; and controlling the vehicle based at least in part on the first adversarial cost and the second adversarial cost.

14. A method comprising:

receiving a candidate trajectory for a vehicle to follow;

receiving object data that includes an object and an object trajectory;

determining a degree of feasibility associated with the object following an adversarial trajectory associated with the object trajectory;

determining a first probability that the vehicle can avoid an interaction with the object following the adversarial trajectory;

determining a second probability that the object is adversarial;

determining a third probability of an interaction;

determining, based at least in part on the degree of feasibility, the first probability, the second probability, and the third probability, an adversarial cost associated with the candidate trajectory; and controlling the vehicle based at least in part on the adversarial cost.

15. The method of claim 14, wherein the adversarial trajectory is a laterally deviated trajectory and the adversarial cost is a lateral adversarial cost, further comprising:

generating, based at least in part on the object trajectory, a longitudinally deviated trajectory that is different than the object trajectory;

generating, based at least in part on the longitudinally deviated trajectory, a longitudinal adversarial cost; and controlling the vehicle based at least in part on the lateral adversarial cost and the longitudinal adversarial cost.

16. The method of claim 14, wherein the interaction is at least one of:

a collision between the vehicle and the object, a distance between the object and the vehicle being below a threshold distance, or a time gap between the object and the vehicle being below a threshold time.

17. The method of claim 14, wherein determining the third probability of the interaction is based at least in part on:

determining a first portion of the candidate trajectory extending between two states of the candidate trajectory;

determining a second portion of the adversarial trajectory extending between two states of the adversarial trajectory;

determining a first geometric area associated with the first portion and a second geometric area associated with the second portion, wherein the first geometric area and the second geometric area are different, the first geometric area representing a region of an environment that is predicted to be occupied based at least in part on the vehicle following the candidate trajectory associated with the first portion; and determining, based at least in part on the first geometric area and the second geometric area, the third probability of interaction.

18. The method of claim 17, wherein determining the third probability of interaction is based at least in part on:

identifying, based at least in part on the first geometric area and the second geometric area, an interaction region;

determining a distance from a state of the candidate trajectory to the interaction region;

determining, based at least in part on modifying a kinematic value of the vehicle, the distance, and kinematic constraints of the vehicle, a location of the vehicle relative to the interaction region; and determining, based at least in part on the distance and the location, the second probability of collision.

19. The method of claim 17, wherein:

the first portion comprises a first constant curvature between the two states of the candidate trajectory; and the second portion comprises a second constant curvature between the two states of the adversarial trajectory.

20. The method of claim 14, further comprising:

determining a collision metric representing a predicted severity level of a predicted collision, wherein determining the collision metric is based at least in part on at least one of:

a relative velocity between the vehicle following the candidate trajectory and the object following the adversarial trajectory, or a relative heading between the vehicle following the candidate trajectory and the object following the adversarial trajectory.

* * * * *